(12) United States Patent
Na et al.

(10) Patent No.: US 7,480,131 B2
(45) Date of Patent: Jan. 20, 2009

(54) HINGE FRAME FOR PORTABLE COMPUTER AND STRUCTURE FOR MOUNTING THE SAME

(75) Inventors: Sang-Ju Na, Seoul (KR); Byoung-Yoon Jin, Suwon (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 11/172,983

(22) Filed: Jul. 5, 2005

(65) Prior Publication Data

US 2006/0028793 A1  Feb. 9, 2006

(30) Foreign Application Priority Data

Jul. 6, 2004 (KR) ............... 10-2004-0052462
Jul. 6, 2004 (KR) ............... 10-2004-0052466

(51) Int. Cl.
*H05K 7/12* (2006.01)

(52) U.S. Cl. ............... 361/683; 361/681; 312/223.2

(58) Field of Classification Search ............... 361/683, 361/681; 312/223.2
See application file for complete search history.

(56) References Cited

U.S. PATENT DOCUMENTS

| 5,237,486 A | 8/1993 | LaPointe et al. | |
| 5,691,880 A * | 11/1997 | Seto et al. | 361/681 |
| 5,796,579 A * | 8/1998 | Nakajima et al. | 361/683 |
| 5,973,920 A | 10/1999 | Altic et al. | |
| 6,101,088 A | 8/2000 | Nakajima et al. | |
| 6,202,256 B1 | 3/2001 | Bovio et al. | |
| 6,646,865 B2 * | 11/2003 | Huang et al. | 361/683 |
| 6,952,340 B2 * | 10/2005 | Son et al. | 361/380 |
| 2003/0007323 A1 | 1/2003 | Huang et al. | |

OTHER PUBLICATIONS

Anonymous: "Integrated retention mechanism for high-end server and workstation platforms", Research Disclosure, Mason Publications, Hampshire, GB, vol. 440, No. 25, (Dec. 2002). XP007127210.
English translation on Chinese Office Action dated Dec. 8, 2006 for application No. 200510084481.X.

* cited by examiner

*Primary Examiner*—Lisa Lea-Edomnds
*Assistant Examiner*—Ingrid Wright
(74) *Attorney, Agent, or Firm*—Birch, Stewart, Kolasch & Birch, LLP

(57) ABSTRACT

The present invention relates to a hinge frame for a portable computer and a structure for mounting the same. The hinge frame of the present invention comprises a frame body through which a plurality of fastening holes are perforated, a hinge fastening portion which is formed at a portion of the hinge body and to which a hinge unit is fastened, and a plurality of covering portions which are formed along an edge of the frame body and cause parts mounted on a board to be seated therein. The present invention provides the advantages of the hinge unit being more firmly fixed to the main body, improved installation strength of connectors and the like mounted on the main board, and relatively reinforcement of the main board.

23 Claims, 17 Drawing Sheets

HINGE FRAME FOR PORTABLE COMPUTER AND STRUCTURE FOR MOUNTING THE SAME

CROSS-REFERENCES TO RELATED APPLICATIONS

This nonprovisional application claims the benefit of Korean Application Nos. P2004-052462, filed on Jul. 6, 2004, and P2004-052466 filed on Jul. 6, 2004, the entirety of each of which are hereby incorporated by reference.

BACKGROUND OF THE INVENTION

1. Field of the Invention

The present invention relates to a portable computer. More particularly, the present invention relates to a hinge frame permitting a hinge assembly to be fixed to a main body of a portable computer and a structure for mounting the same.

2. Description of the Background Art

A hinge frame is a component for securing a portion of a hinge assembly for allowing a display unit to be pivoted on a main body of a portable computer. In general, the hinge frame is installed in the main body of the portable computer. FIG. 1 shows the external configuration of a general portable computer of the background art. A main body 1 of the portable computer is of a generally flat parallelepiped shape, and a variety of parts of the portable computer are installed within the main body 1.

A bottom case 3 and a keyboard deck 4 define an external appearance of the main body 1. The bottom case 3 defines a bottom external appearance of the main body 1 and the keyboard deck 4 defines a top external appearance of the main body. A keyboard 5 is installed on the keyboard deck 4. A display unit 9 is connected to a rear end of the main body 1 via a hinge unit 7. The display unit 9 is operated such that it is folded onto or unfolded at a predetermined angle from the main body 1 about the hinge unit 7. The display unit 9 is provided with a liquid crystal panel 10.

FIG. 2 shows a state where hinge frames of the background art are installed within the main body of a personal computer. A main board 11 is provided in the bottom case 3. A plurality of connectors 13 and a power jack 14 are installed at a position on the main board 11 corresponding to a rear end of the bottom case 3. The connectors 13 and power jack 14 are exposed from the rear surface of the main body 1. In addition, the hinge frames 16 are provided at both sides of the rear end of the bottom case 3. The hinge frames 16 are generally fastened and fixed to the bottom case 3 together with the main board 11. A portion of the hinge unit 7 is fixed to the hinge frame 16. A radiating fan 18 is also shown in FIG. 2.

However, the present inventors have determined that the structure of the background art suffer from the following disadvantages. As the overall dimensions of portable computers have recently increased, the size of the display unit 9 has increased accordingly. Therefore, the weight of the display unit 9 is increased, and a load that is applied to the hinge unit 7 pivotably supporting the display unit 9 with respect to the main body 1 is also increased. Accordingly, the present inventors have determined that the hinge frame 16 for fixing the hinge unit 7 to the main body 1 must be able to support larger loads. However, the hinge frames 16 of the background art merely secure the hinge unit 7 to the main body 1, and are not sufficient to handle the increased loading that is present in the relatively larger, portable computers.

Since the connectors 13 and the power jack 14 are mounted on only the main board 11, the strength of the installation is relatively weak. In addition, there is the added inconvenience of an additional metal plate that should be installed to cover the connectors 13 and the power jack 14 to prevent electromagnetic waves from leaking to the surroundings through the connectors 13, the power jack 14 and the like. Furthermore, the main board 11 should be partially cut away and removed in order to prevent interference with the parts installed on the bottom case 3. Therefore, there is a further problem in that a portion adjacent to the cut-away portion is relatively narrowed and its strength is thus weakened.

SUMMARY OF THE INVENTION

The present invention overcomes the shortcomings associated with the background art and achieves other advantages not realized by the background art.

An object of the present invention is to provide a latch device that securely engages a main body and a display to each other and easily operates in relatively large portable computers.

Another object of the present invention is to provide a latch device that makes it possible to minimize a space required to install a latch and a plurality of hooks typically operated by a release mechanism.

Another object of the present invention is to provide a latch device that makes it possible to minimize the number of parts in the latch assembly.

One or more of these and other objects are accomplished by a hinge frame for a portable computer, comprising a frame body having an upper surface and a lower surface, the frame body being formed with at least one perforated fastening hole; a hinge fastening portion being formed at a portion of the frame body and being capable of receiving a hinge unit fastened on the upper surface thereto; and at least one covering portion being formed along an edge of the frame body for covering parts mounted on a board positioned beneath the lower surface of the frame body, wherein the at least one covering portion includes a raised surface protruding to a first side of the frame body and a recess facing toward an opposite side of the frame body.

One or more of these and other objects are accomplished by a portable computer main body comprising a bottom case including at least one fastening boss protruding from a bottom surface thereof; a board fastened to the fastening bosses of the bottom case; a hinge frame, the hinge frame having a frame body having an upper surface and a lower surface, the frame body being formed with at least one perforated fastening hole; a hinge fastening portion being formed at a portion of the frame body and being capable of receiving a hinge unit fastened on the upper surface thereto; and at least one covering portion being formed along an edge of the frame body for covering parts mounted on the board positioned beneath the lower surface of the frame body, wherein the at least one covering portion includes a raised surface protruding to a first side of the frame body and a recess facing toward an opposite side of the frame body; and a hinge unit secured to the hinge frame and permitting a display unit to rotate about the hinge unit with respect to the main body.

One or more of these and other objects are accomplished by a portable computer comprising a bottom case including at least one fastening boss protruding from a bottom surface thereof; a display unit secured to the bottom case; a board fastened to the fastening bosses of the bottom case; a hinge frame, the hinge frame having a frame body having an upper surface and a lower surface, the frame body being formed with at least one perforated fastening hole; a hinge fastening portion being formed at a portion of the frame body and being capable of receiving a hinge unit fastened on the upper surface thereto; and at least one covering portion being formed along an edge of the frame body for covering parts mounted on the board positioned beneath the lower surface of the frame body, wherein the at least one covering portion includes a raised surface protruding to a first side of the frame body and a recess facing toward an opposite side of the frame body; and a hinge unit secured to the hinge frame and permitting the display unit to rotate about the hinge unit with respect to the main body.

One or more of these and other objects are accomplished by a method for assembling a hinge frame for a computer, wherein the hinge frame includes a frame body having an upper surface and a lower surface, the frame body being formed with at least one perforated fastening hole; a hinge fastening portion being formed at a portion of the frame body and being capable of receiving a hinge unit fastened on the upper surface thereto; and at least one covering portion being formed along an edge of the frame body for covering a part mounted on a board positioned beneath the lower surface of the frame body, wherein the at least one covering portion includes a raised surface protruding to a first side of the frame body and a recess facing toward an opposite side of the frame body, the method comprising securing the hinge frame to a bottom case of the computer, wherein the board is positioned between an upper surface of the bottom case and a lower surface of the hinge frame, the at least one covering portion covering the part mounted on the board.

One or more of these and other objects are accomplished by a hinge frame for a portable computer, comprising a frame body formed with a plurality of perforated fastening holes and a perforated portion for permitting a board positioned beneath the frame body to be exposed through the frame body; a hinge unit; a hinge fastening portion formed at a portion of the frame body to permit the hinge unit to be fastened thereto; a plurality of covering portions formed along an edge of the frame body to cause parts mounted on a board to be seated beneath the covering portions; and a reinforcing portion formed at a portion of the frame body along a periphery of the perforated portion and being fastened to the board to reinforce the board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
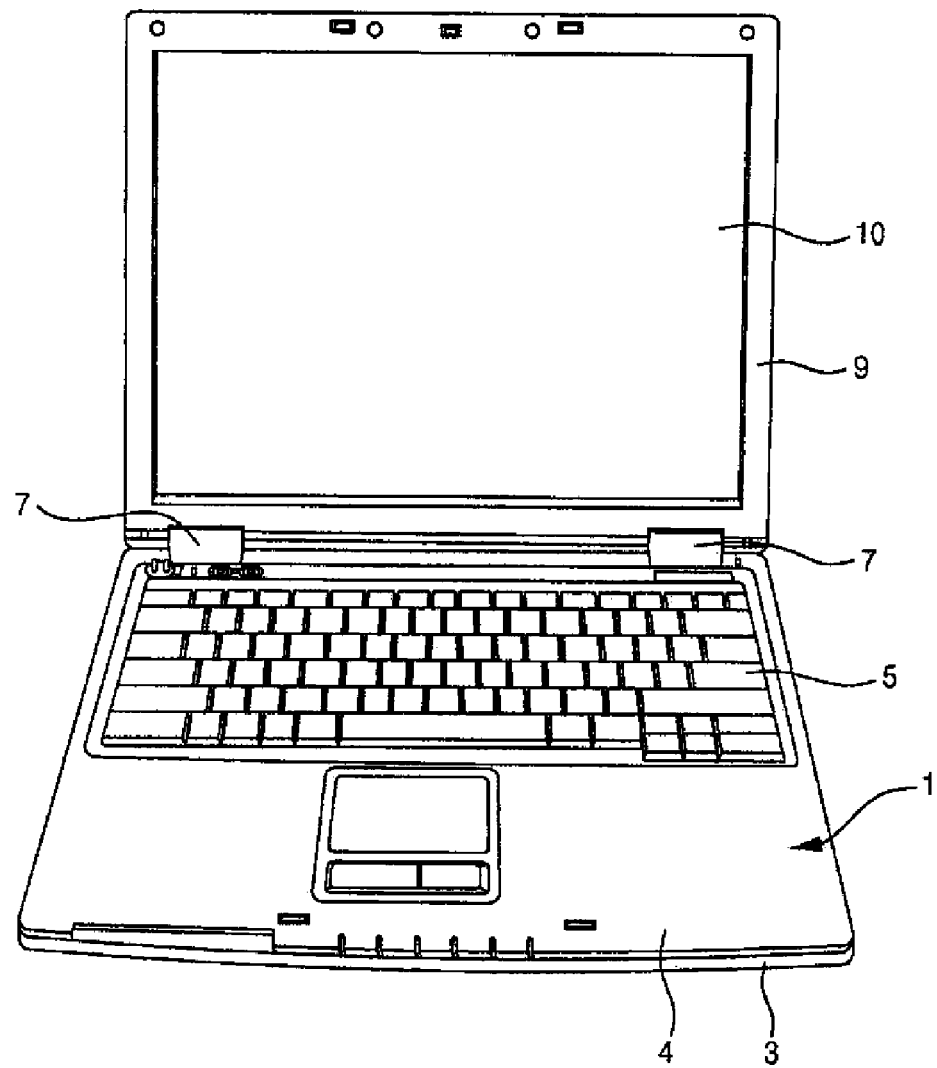
FIG. 1 is a perspective view showing an external configuration of a general portable computer of the background art.
Figure 2:
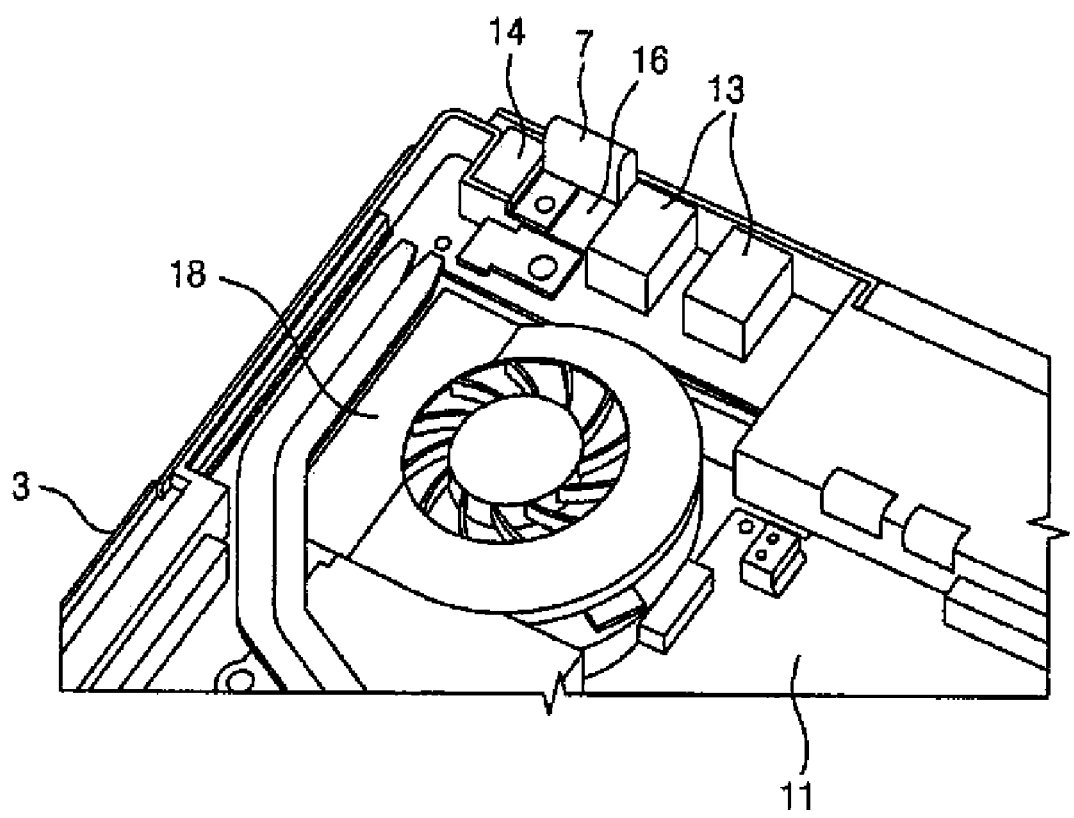
FIG. 2 is a perspective view showing that a related art hinge frame is installed within a main body of a portable computer.
Figure 3:
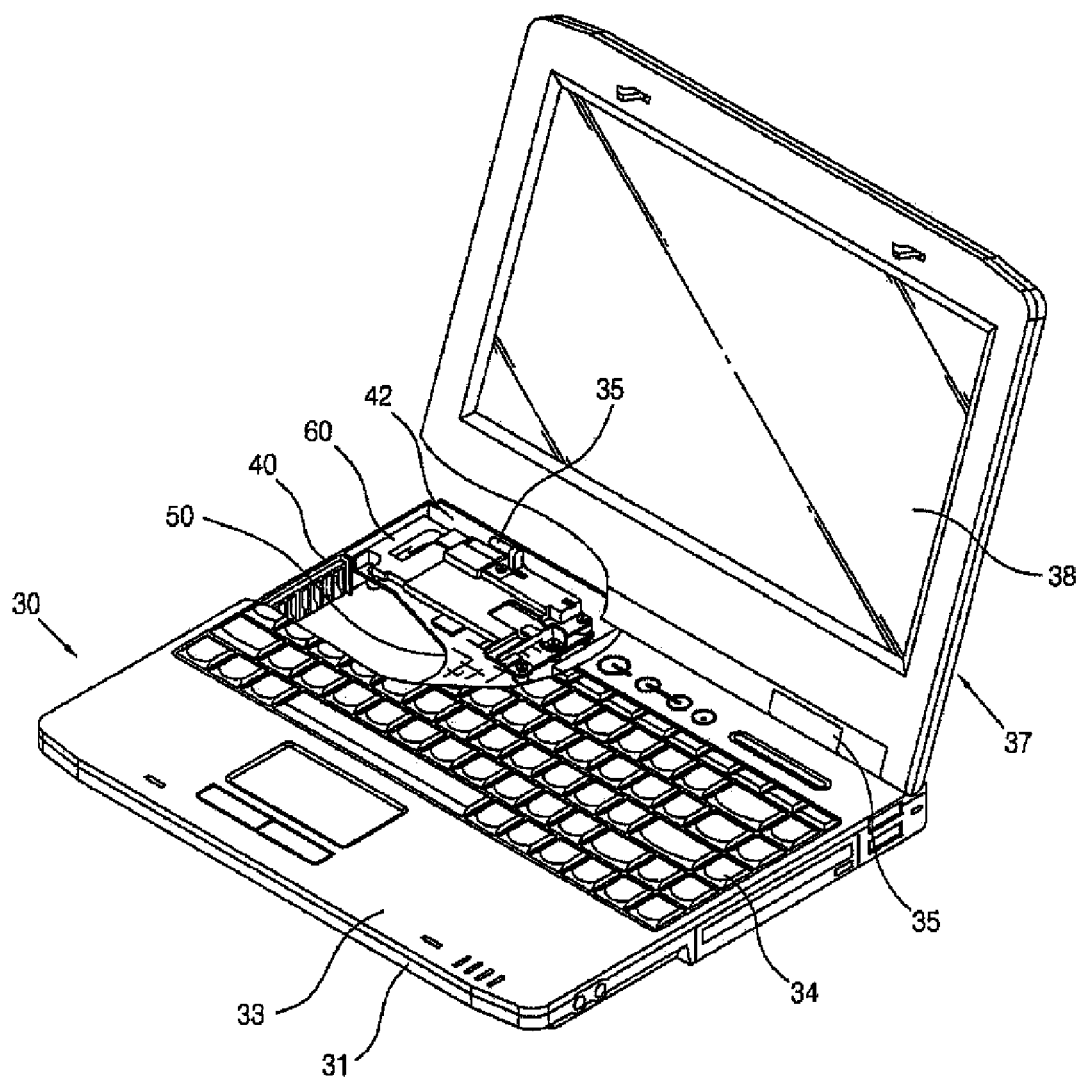
FIG. 3 is a partially cut-away, perspective view showing the configuration of a portable computer in which a hinge frame according to a first embodiment of the present invention is employed.
Figure 4:
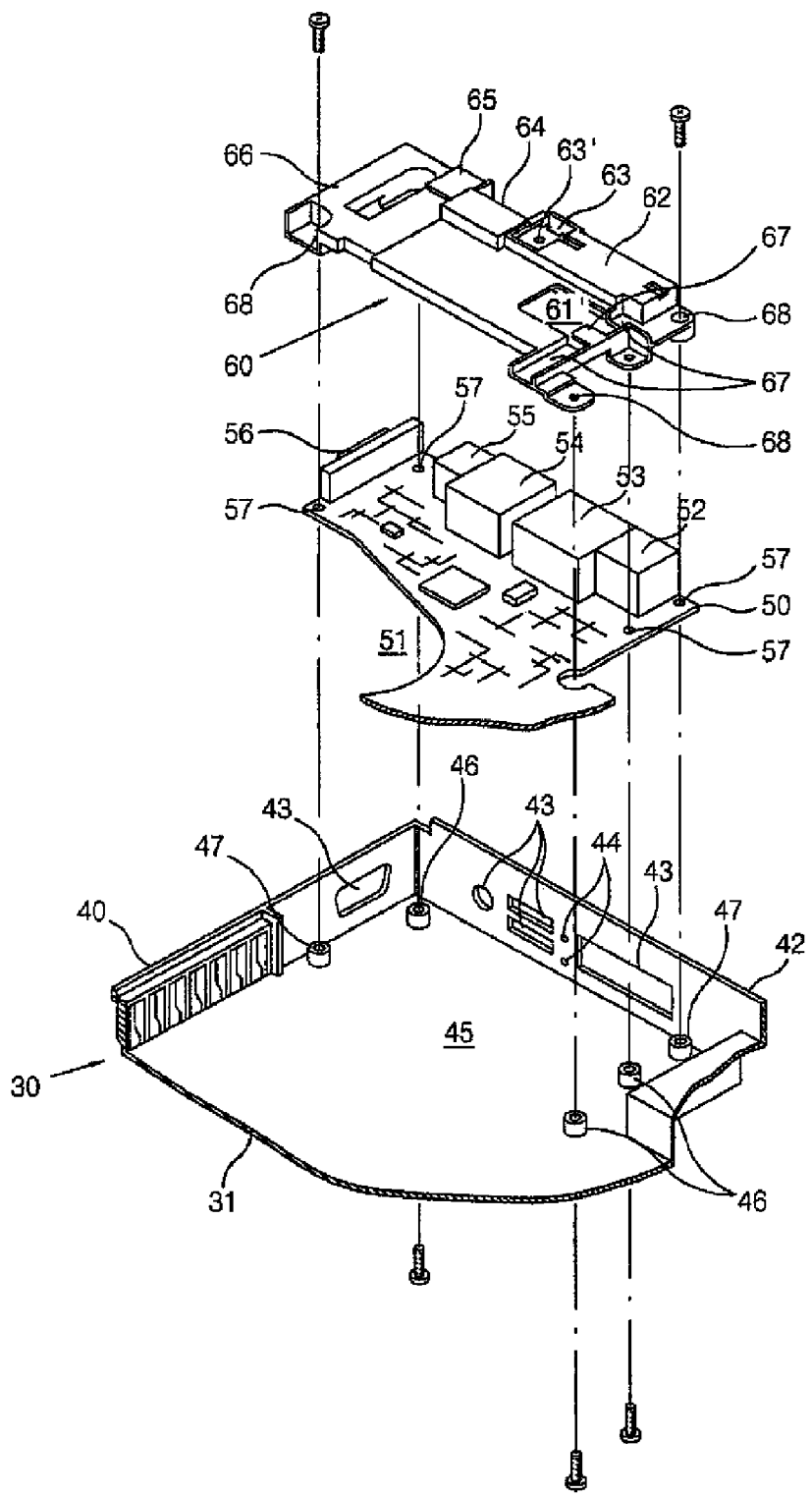
FIG. 4 is a partially cut-away, exploded perspective view showing the configuration of the first embodiment of the present invention.
Figure 5A:
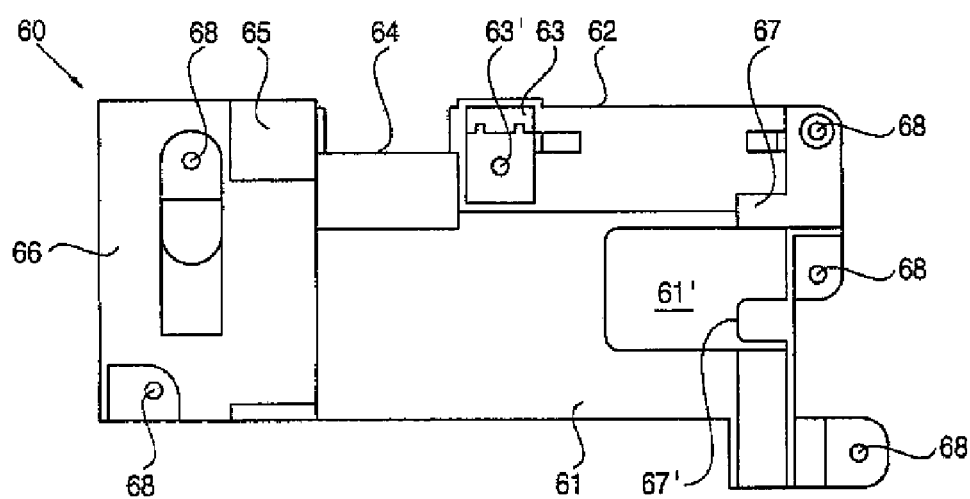
FIG. 5a is a plan view showing the configuration of the hinge frame according to the first embodiment of the present invention.
Figure 5B:
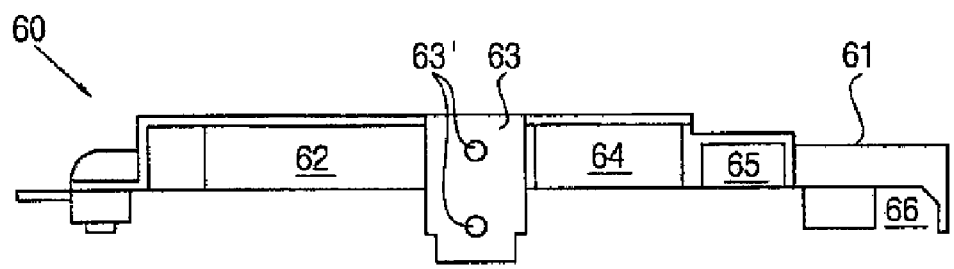
FIG. 5b is a rear view showing the configuration of the hinge frame according to the first embodiment of the present invention.
Figure 5C:
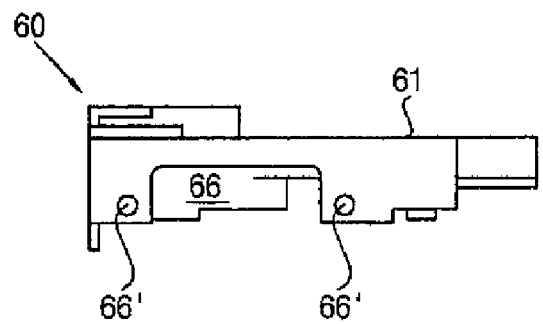
FIG. 5c is a left-side view showing the configuration of the hinge frame according to the first embodiment of the present invention.
Figure 5D:
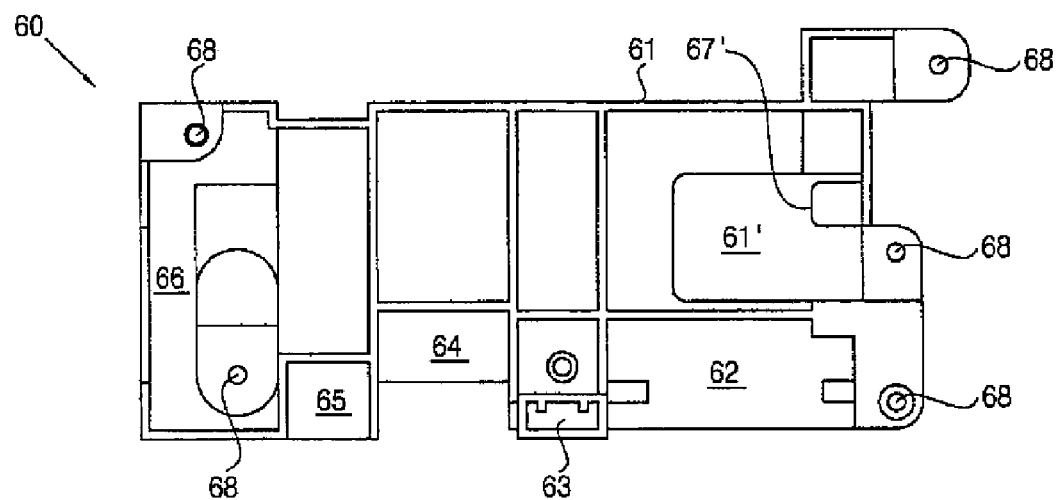
FIG. 5d is a bottom view showing the configuration of the hinge frame according to the first embodiment of the present invention.
Figure 5E:
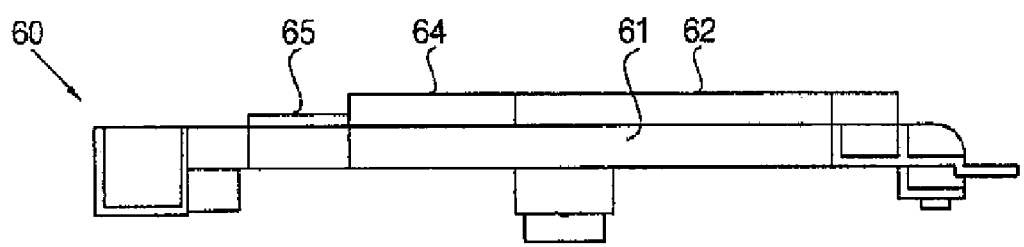
FIG. 5e is a front view showing the configuration of the hinge frame according to first embodiment of the present invention.
Figure 5F:
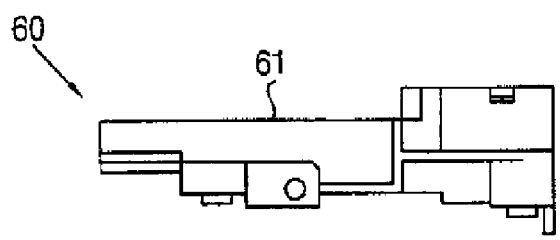
FIG. 5f is a right-side view showing the configuration of the hinge frame according to first embodiment of the present invention.
Figure 6:
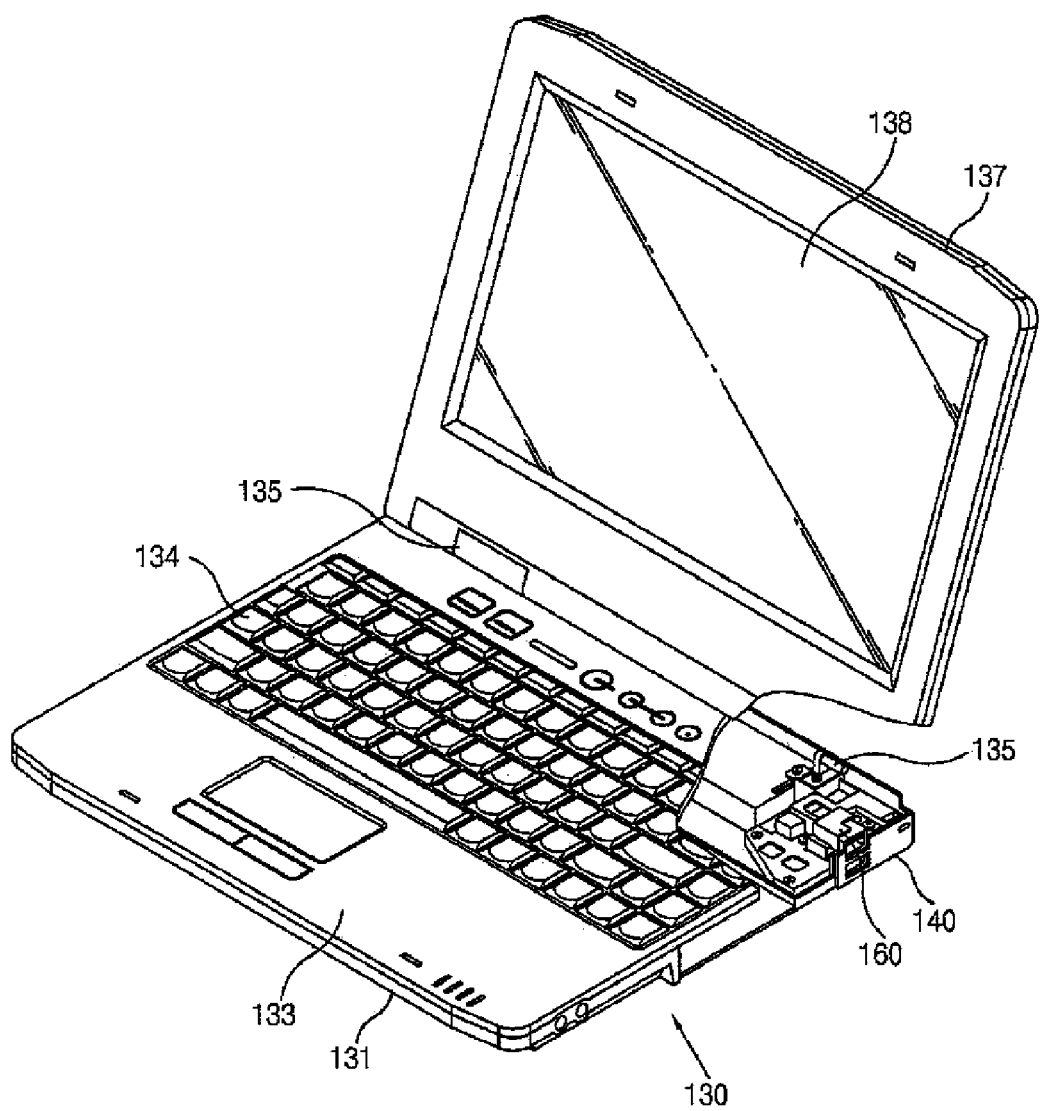
FIG. 6 is a partially cut-away, perspective view showing the configuration of a hinge frame according to a second embodiment of the present invention.
Figure 7:
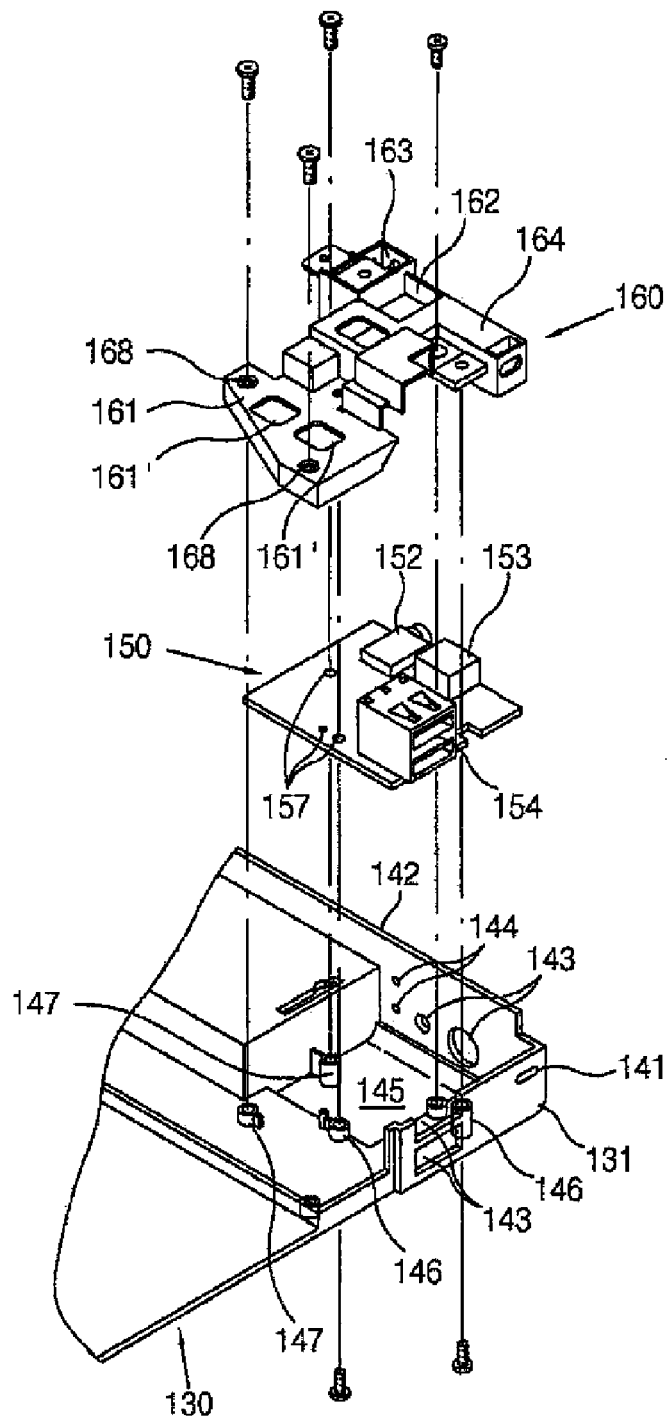
FIG. 7 is a partially, cut-away exploded perspective view showing the configuration of the hinge frame of the second embodiment of the present invention.
Figure 8A:
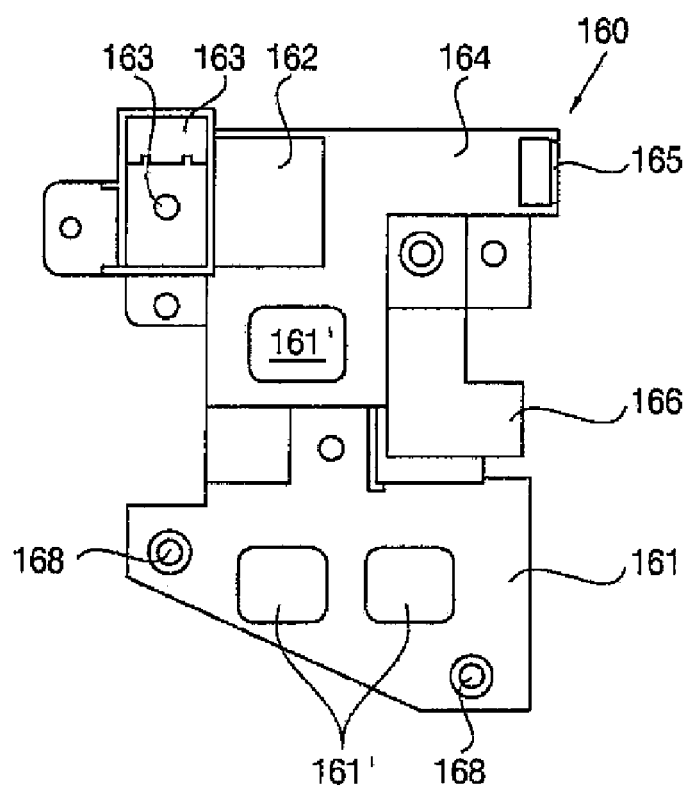
FIG. 8a is a plan view showing the configuration of the hinge frame according to the second embodiment of the present invention.
Figure 8B:
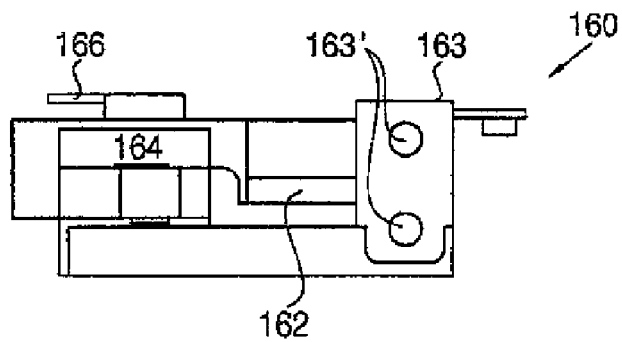
FIG. 8b is a rear view showing the configuration of the hinge frame according to the second embodiment of the present invention.
Figure 8C:
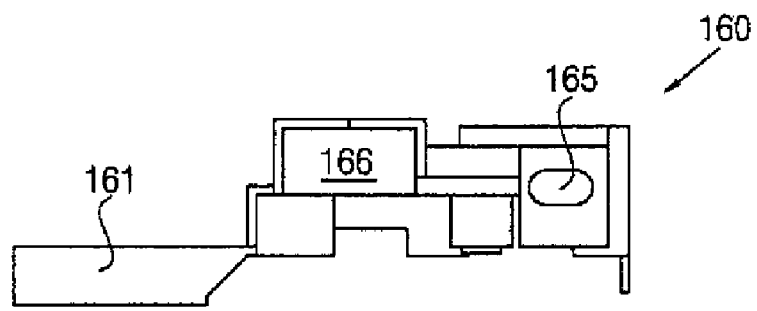
FIG. 8c is a right-side view showing the configuration of the hinge frame according to the second embodiment of the present invention
Figure 8D:
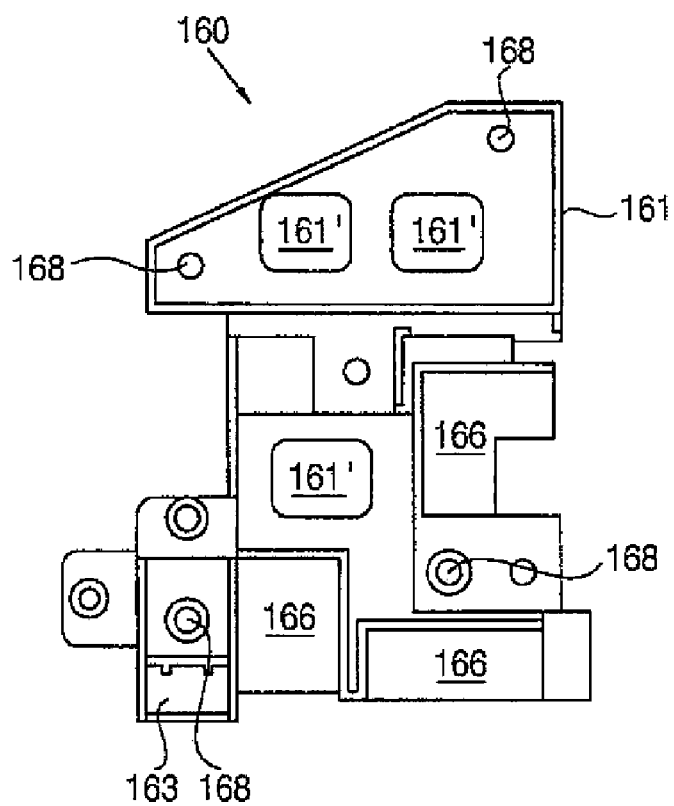
FIG. 8d is a bottom view showing the configuration of the hinge frame according to the second embodiment of the present invention.
Figure 8E:
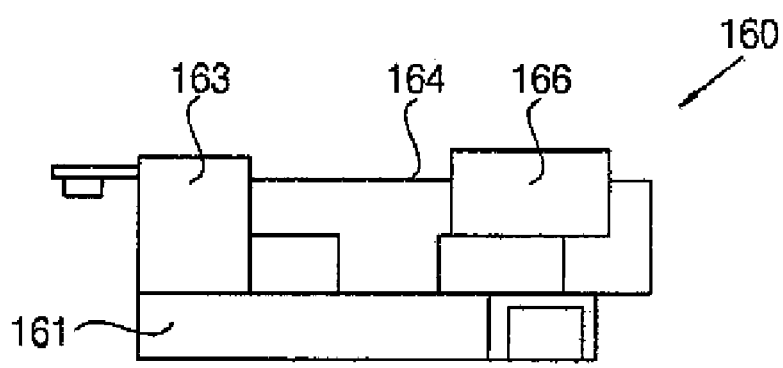
FIG. 8e is a front view showing the configuration of the hinge frame according to second embodiment of the present invention.
Figure 8F:
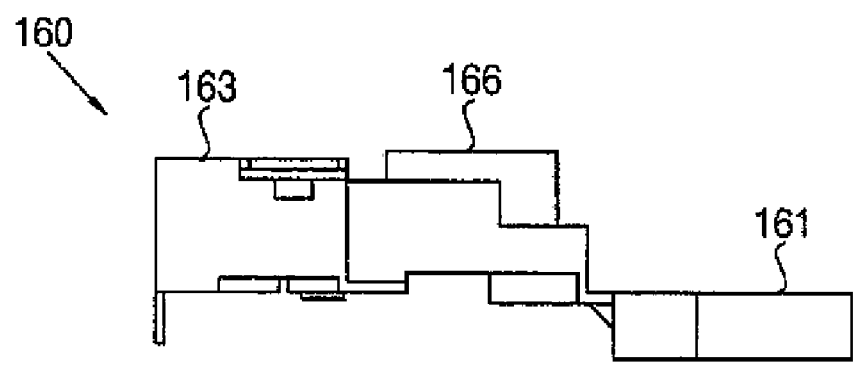
FIG. 8f is a left-side view showing the configuration of the hinge frame according to second embodiment of the present invention.

The present invention will be described hereinafter with reference to the accompanying drawings. FIG. 3 is a partially cut-away, perspective view showing the configuration of a portable computer having a hinge frame according to a first embodiment of the present invention. FIG. 4 is a partially cut-away, exploded perspective view showing the configuration of the first embodiment of the present invention. FIG. 5a is a plan view showing the configuration of the hinge frame according to the first embodiment of the present invention. FIG. 5b is a rear view showing the configuration of the hinge frame according to the first embodiment of the present invention. FIG. 5c is a side view showing the configuration of the hinge frame according to the first embodiment of the present invention. FIG. 5d is a bottom view showing the configuration of the hinge frame according to the first embodiment of the present invention.

Referring to these figures, a bottom case 31 and a keyboard deck 33 define an external appearance of a main body 30 of the portable computer. In general, the bottom case 31 defines a bottom external appearance of the main body 30 while the keyboard deck 33 defines a top external appearance of the main body. A keyboard 34 is provided on the keyboard deck 33. A display unit 37 is connected to a rear end of the main body 30 via a hinge unit 35. The display unit 37 can be rotated about the hinge unit 35 with respect to the main body 30. The display unit 37 is generally provided with a liquid crystal panel 38 in a preferred embodiment.

A side wall 40 is provided at a rear end of a side of the bottom case 31. The side wall 40 defines a portion of a side surface of the main body 30. A rear wall 42 is provided at a rear end of the bottom case 31 such that it is connected to the rear end of the side wall 40. The rear wall 42 defines a rear surface of the main body 30. A plurality of openings 43 are formed on the side wall 40 and rear wall 42. The openings 43 are used to expose the connectors 52, 53, 54 and 56 and a power jack 55, which will be explained later, to the outside. Fastening holes 44 for fastening the hinge unit 35 are perforated into the rear wall 42.

A plurality of fastening bosses 46 are formed in a region adjacent to a rear corner of the bottom case 31, e.g., a corner where the side wall 40 and the rear wall 42 are interconnected with each other (hereinafter, referred to as a "corner region 45"). A hole through which the bottom case 31 is fully penetrated is formed at each of the fastening bosses 46. In addition to the fastening bosses 46, a plurality of guide bosses 47 are provided at the corner region 45. Each of the guide bosses 47 is formed with a predetermined groove. Each of the guide bosses 47 supports the main board 50 to be explained later and also causes an end of a fastener, which couples the main board 50 and the hinge frame 60 with each other, to be securely seated into its groove.

The main board 50 is installed within the main body 30. A variety of parts including a central processing unit (CPU) are mounted on the main board 50. A variety of the connectors 52, 53, 54 and 56 and the power jack 55 are mounted on a corner of the main board 50 corresponding to the corner region 45. A cut-away portion 51 that is removed from the main board 50 to prevent interference with other parts is also shown.

A modem connector 52 is provided at a rear edge of the main board 50 adjacent to the rear wall 42. The modem connector 52 serves to connect a modem and a telephone. A LAN connector 53 is mounted next to the modem connector 52. The LAN connector 53 serves to connect a hub and a LAN card. A USB connector 54 is provided at the rear edge of the main board 50 to be adjacent to the LAN connector 53. The USB connector 54 serves to connect a USB device and the main board 50. A power jack 55 is also provided at the rear edge of the main board 50 and is adjacent to the USB connector 54. The power jack 55 serves to connect an external power source and the main board 50. An external monitor connector 56 is provided at a side edge of the main board 50 adjacent to the side wall 40. The external monitor connector 56 is used to transmit image information to an external monitor.

In addition, a plurality of fastening holes 57 are formed on the region of the main board where the connectors 52, 53, 54 and 56 and the power jack 55 are mounted. The fastening holes 57 are perforated at positions corresponding to the fastening bosses 46 and guide bosses 47. The fastening holes 57 are used for the fastening of the bottom case 31 and the hinge frame 60 to be explained later.

The hinge frame 60 is used to secure the hinge unit 35 to the main body 30. The hinge frame 60 also covers the connectors and power jack 52, 53, 54, 55 and 56 and reinforces the main board 50 in addition to securing the hinge unit 35. The hinge frame 60 is fastened and secured to the main board 50 and the bottom case 31.

FIGS. 5A to 5D show in detail the configuration of the hinge frame 60. It is preferred that a frame body 61 of the hinge frame 60 be made of a metal material to provide a desired strength and/or to shield electromagnetic waves. However, if the function of shielding electromagnetic waves is not required, the frame body 61 may be molded from a synthetic resin.

The frame body 61 is formed with a perforated portion 61' at a certain position thereof. The perforated portion 61' is formed by vertically perforating the frame body 61 and used to allow the parts installed on the main board 50 to be exposed to the outside when the frame body 61 is mounted on the main board 50. The size, the position, etc. of the perforated portion 61' should vary with the positions of parts mounted on the main board 50.

A first covering portion 62 is provided at a certain position on the frame body 61. The first covering portion 62 is formed in such a manner that it protrudes at a top face of the frame body 61 and appears as a recess with respect to a bottom face of the frame body. The first covering portion 62 is open toward the opening 43 of the rear wall 42 and the bottom of the frame body 61. The first covering portion 62 serves to cover the modem connector 52 and the LAN connector 53. Accordingly, the modem and LAN connectors 52 and 53 mounted on the main board 50 are seated in the first covering portion 62. When the frame body 61 is fastened to the main board 50, the modem and LAN connectors 52 and 53 are firmly positioned in a space defined by the main board 50 and the first covering portion 62 of the frame body 61.

A hinge fastening portion 63 is provided at a position adjacent to the first covering portion 62. The hinge unit 35 is fastened to the hinge fastening portion 63. A plurality of fastening holes 63' are perforated through the hinge fastening portion 63.

A second covering portion 64 is formed at a position adjacent to the hinge fastening portion 63. The second covering portion 64 serves to cover the USB connector 54. The second covering portion 64 is also formed in such a manner that it protrudes at the top face of the frame body 61 and appears as a recess with respect to the bottom face of the frame body. A tip end of the second covering portion 64 is formed to be relatively inwardly recessed such that it can be open toward a top face of the frame body. The second covering portion 64 is also open toward the rear wall 42 such that the USB connector 54 is exposed to the outside.

A third covering portion 65 is formed next to the second covering portion 64. The third covering portion 65 serves to cover the power jack 55. The third covering portion 65 is formed in such a manner that it includes a recess facing toward the bottom face of the frame body 61 and opens toward the rear wall 42.

A fourth covering portion 66 is provided at a position on the frame body 61 corresponding to the side wall 40. The fourth covering portion 66 serves to cover the external monitor connector 56. The fourth covering portion 66 is also formed in such a manner that it protrudes at the top face of the frame body 61 and is recessed at the bottom face of the frame body. The fourth covering portion 66 is open toward the side wall 40 such that the external monitor connector 56 can be exposed to the outside through the opening 43 of the side wall 40.

In addition, a cable passage 67 is formed in the frame body 61. The cable passage 67 is formed along a portion on a top surface of the frame body 61. The cable passage 67 is formed by causing the top surface of the frame body 61 to be recessed. A protrusion 67' is formed at a certain position along the cable passage 67. The protrusion 67' prevents cables from inadvertently escaping out of the cable passage 67. The cables provide the electrical connection between the main body 30 and the display unit 35 pass through the cable passage 67.

A plurality of fastening holes 68 are perforated through the frame body 61. The fastening holes are used to fasten the hinge frame 60 to the main board 50 or bottom case 31. The fastening holes are formed at positions where the covering portions 62, 64, 65 and 66 are not formed, by vertically perforating the frame body 61. In particular, since the frame body 61 requires a space for defining the covering portions 62, 64, 65 and 66, the fastening holes 68 are perforated at the positions where the top surface of the frame body 61 is relatively depressed. The fastening holes 68 are formed at the positions corresponding to the fastening holes 57 on the main board 50.

FIGS. 6 to 8D show a second embodiment of the present invention. Referring to these figures, a bottom case 131 and a keyboard deck 133 define an external appearance of a main body 130 of the portable computer, and a keyboard 134 is provided on a top surface of the keyboard deck 133.

A display unit 137 is connected to a rear end of the main body 130 via a hinge unit 135. The hinge units 135 are generally provided at both sides of the rear end of the main body 130. The display unit 137 can be rotated about the hinge units 135 with respect to the main body 130. The display unit 137 is generally provided with a liquid crystal panel 138.

A side wall 140 is provided at a rear end of a side of the bottom case 131. The side wall 140 defines a portion of a side surface of the main body 130. A locking hole 141 is provided at a position adjacent to a rear end of the side wall 140. The locking hole 141 is a part where a fastener is fixed, e.g., such as so-called Kensington lock.

A rear wall 142 is provided at the rear end of the bottom case 131 such that it is connected to the rear end of the side wall 140. The rear wall 142 defines a rear surface of the main body 130. A plurality of openings 143 are formed on the side wall 140 and rear wall 142. The openings 143 are used to expose jacks 152 and 153 and a connector 154, which will be explained later, to the outside. Fastening holes 144 for fastening the hinge unit 135 are perforated into the rear wall 142.

A plurality of fastening bosses 146 are formed in a region adjacent to a rear corner of the bottom case 131, i.e. a corner region 145 where the side wall 140 and the rear wall 142 are interconnected with each other. A hole through which the bottom case 131 is fully penetrated is formed at each of the fastening bosses 146.

In addition to the fastening bosses 146, a plurality of guide bosses 147 are provided at the corner region 145. Each of the guide bosses 147 opens upwardly and is formed with a predetermined groove, and accepts a tip end of the fastener for fastening a board 150 and a hinge frame 160 to each other for securely seating the fastener within the guide bosses 147.

Furthermore, the board 150 is installed within the main body 130. A variety of parts are mounted on the board 150. The board 150 may be, for example, a portion of the main board 150 or an additional board separated from the main board 50.

An audio jack 152 is connected to edge of the board 150 corresponding to the rear wall 142. The audio jack 152 serves to input/output audio signals. A super video jack 153 is provided next to the audio jack 152. The super video jack 153 serves to input/output video signals. A USB connector 154 is provided at another edge of the board 150 corresponding to the side wall 140. The USB connector 154 serves to connect a USB device and the main body 130. Fastening holes 157 permitting the board 150 to be fastened to the bottom case 131 or hinge frame 160 are formed in the board 150.

The hinge frame 160 is used to secure the hinge unit 135 to the main body 130. The hinge frame 160 also covers the jacks and connector 152, 153 and 154 and reinforces the main board 150 in addition to fixing the hinge unit 135. The hinge frame 160 is fastened and fixed to the board 150 and the bottom case 131.

FIGS. 8A to 8D show in detail the configuration of the hinge frame 160. It is preferred that a frame body 161 of the hinge frame 160 be made of a metal material to provide a desired strength and/or to shield electromagnetic waves. However, if the function of shielding electromagnetic waves is not required, the frame body 161 may be molded from a synthetic resin.

The frame body 161 is formed with a perforated portion 161'. The perforated portion 161' is formed by vertically perforating the frame body 161 and used to allow the parts installed on the main board 150 to be exposed to the outside when the frame body 161 is mounted on the main board 150. Although a preferred relative sizing and positioning is shown in the enclosed drawings, it will be appreciated that the size, the position, etc. of the perforated portion 161' should vary with the positions of parts mounted on the main board 50.

A first covering portion 162 is provided at a certain position on the frame body 161. The first covering portion 162 is formed in such a manner that it is recessed into top and bottom surfaces of the frame body 161. This is because the height of audio jack 152 covered by the first covering portion 162 is relatively low. The first covering portion 162 opens toward the opening 143 of the rear wall 142 and the bottom of the frame body 161. The audio jack 152 mounted on the board 150 is securely seated in the first covering portion 162. Therefore, when the frame body 161 is fastened to the board 150, the audio jack 152 is firmly positioned in a space defined by the board 50 and the first covering portion 162 of the frame body 161.

A hinge fastening portion 163 is provided at a position adjacent to the first covering portion 162. The hinge unit 135 is fastened to the hinge fastening portion 163. A plurality of fastening holes 163' are perforated through the hinge fastening portion 163 for securing the hinge unit 135 to the hinge fastening portion 163.

A second covering portion 164 is formed at a position adjacent to the first covering portion 161 but opposite to the hinge fastening portion 163. The second covering portion 164 serves to cover the super video jack 153. The second covering portion 64 is formed in such a manner that it protrudes at the top face of the frame body 61 and is recessed at the bottom face of the frame body. The second covering portion 164 is also open toward the rear wall 142 such that the super video jack 153 is exposed to the outside through the opening 143.

A locking hole reinforcing portion is provided at a side of the frame body 161 corresponding to the side wall 140. The locking hole reinforcing portion 165 is formed with a locking hole 165' at a position corresponding to the locking hole 141. Therefore, a protrusion of the lock, e.g., a Kensington lock, introduced into the hinge frame through the locking hole 141 is hooked in the locking hole 165' of the locking hole reinforcing portion 165 made of a metal material.

A third covering portion 166 is formed at the side of the frame body 161 corresponding to the side wall 140. The third covering portion 166 serves to cover the USB connector 154. The third covering portion 166 is also formed in such a manner that it protrudes at the top face of the frame body 161 and is recessed at the bottom face of the frame body 161. The third covering portion 166 is open toward the side wall 140 such that USB connector 154 can be exposed to the outside through the opening 143 of the side wall 140. A portion of a tip end of the third covering portion 166 is formed to be relatively inwardly retracted or recessed.

A plurality of fastening holes 168 are perforated through the frame body 161. The fastening holes are used to fasten the hinge frame body 160 to the board 150 or bottom case 131. The fastening holes are formed at positions where the covering portions 162, 164 and 166 are not formed, by vertically perforating the frame body 161. In particular, since the frame body 161 requires a space for defining the covering portions 162, 164 and 166, the fastening holes 168 are formed at the positions where the top surface of the frame body 161 is relatively depressed. Of course, the position or height of the fastening holes 168 may vary with an internal shape of the bottom case 131.

Figure 9:
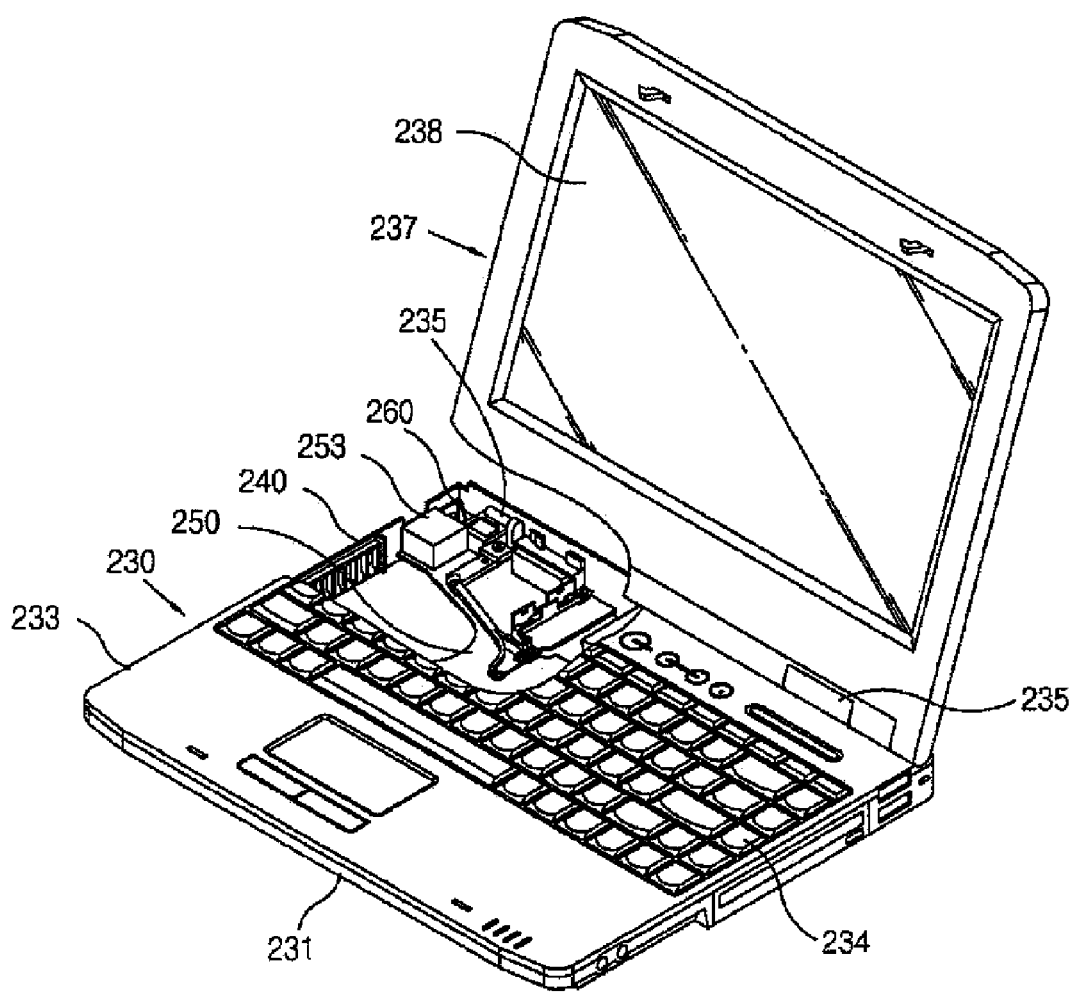
FIG. 9 is a partially cut-away, perspective view showing the configuration of a portable computer having a hinge frame according to a third embodiment of the present invention.
Figure 10:
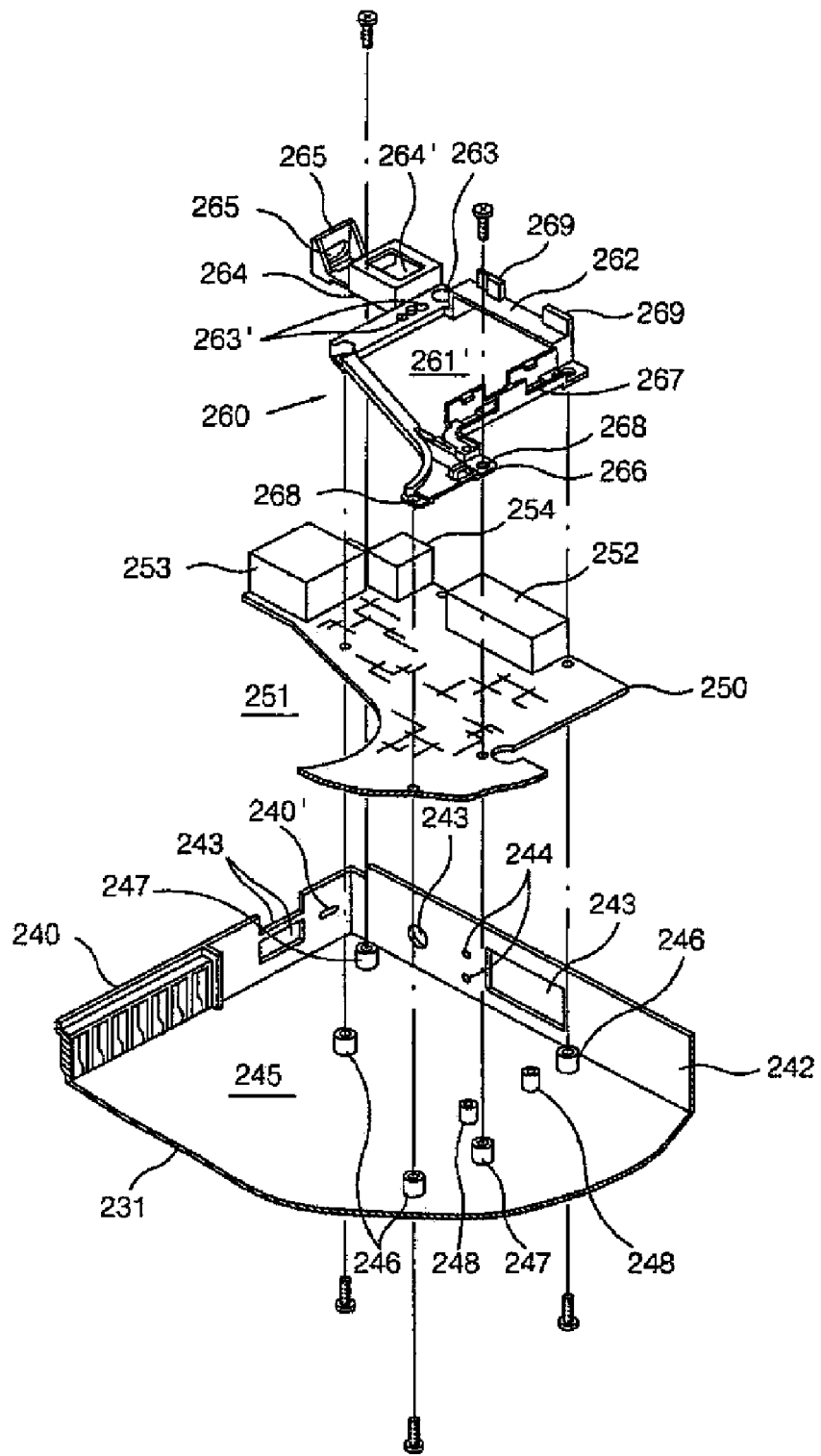
FIG. 10 is a partially cut-away, exploded perspective view showing the configuration of the hinge frame according to the third embodiment of the present invention.
Figure 11A:
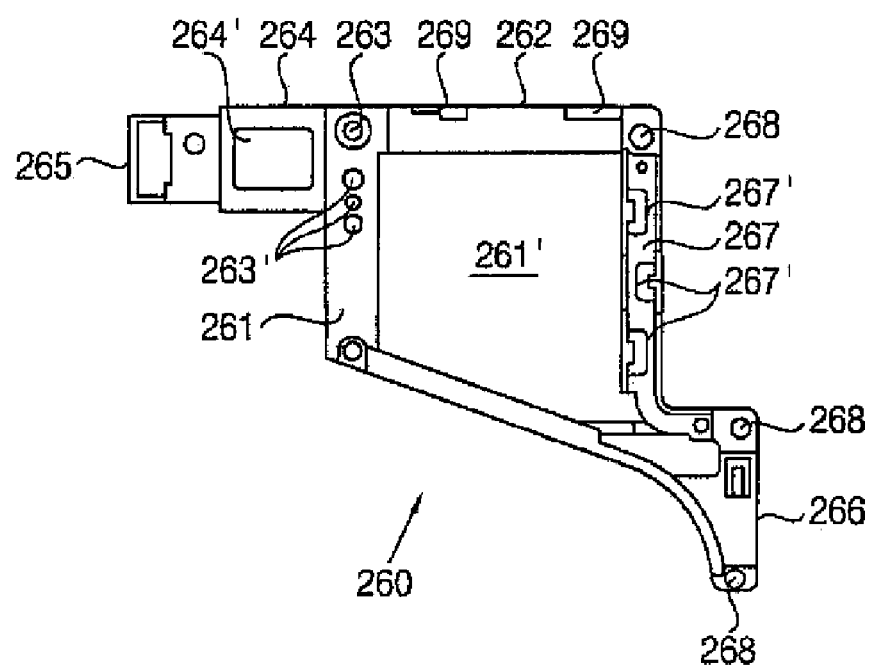
FIG. 11a is a plan view showing the configuration of the hinge frame according to the third embodiment of the present invention.
Figure 11B:
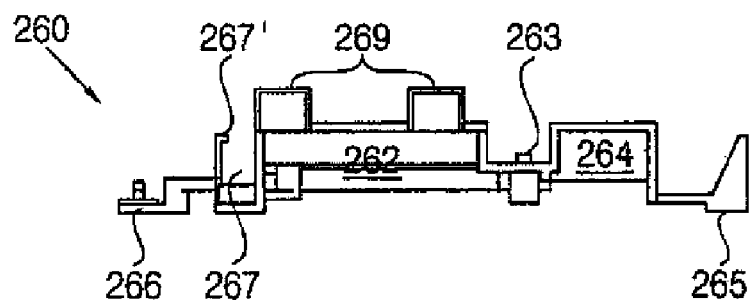
FIG. 11b is a rear view showing the configuration of the hinge frame according to the third embodiment of the present invention.
Figure 11C:
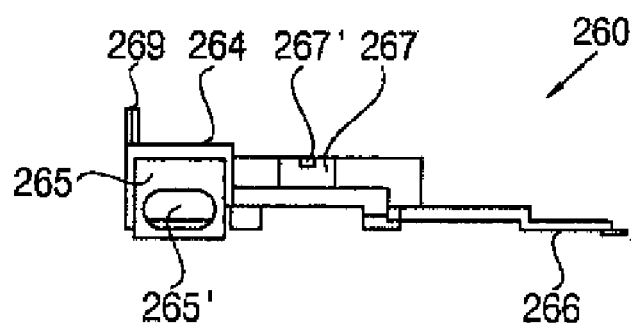
FIG. 11c is a left-side view showing the configuration of the hinge frame according to the third embodiment of the present invention.
Figure 11D:
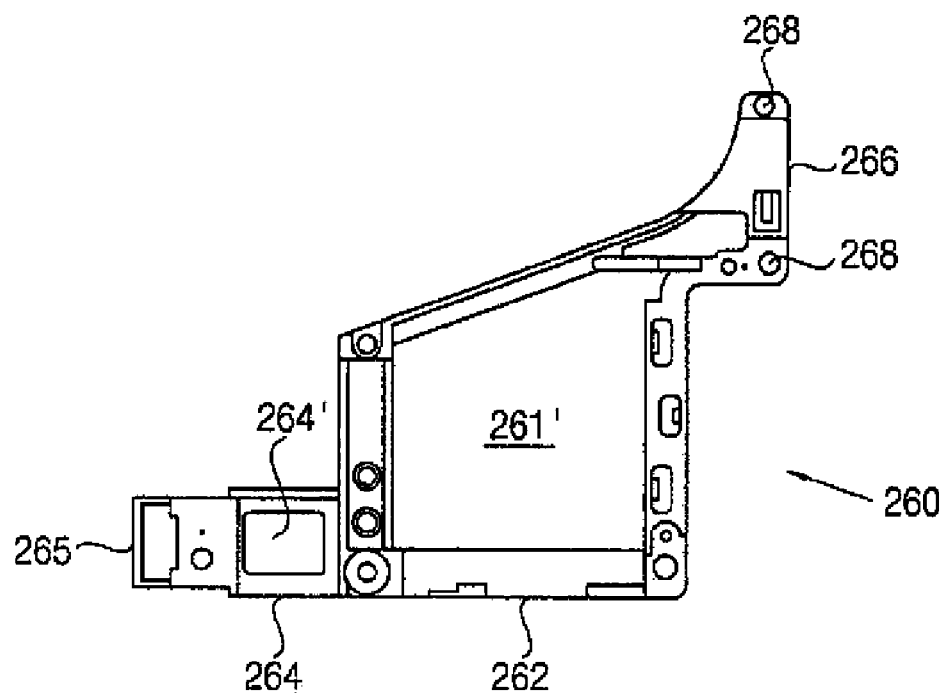
FIG. 11d is a bottom view showing the configuration of the hinge frame according to the third embodiment of the present invention.
Figure 11E:
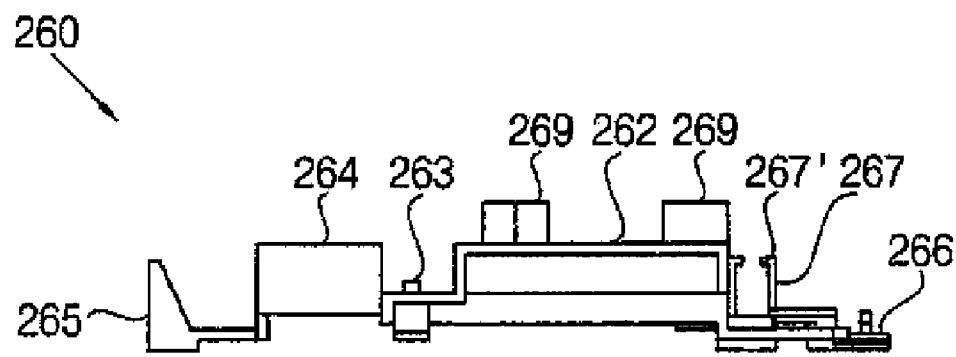
FIG. 11e is a front view showing the configuration of the hinge frame according to third embodiment of the present invention.
Figure 11F:
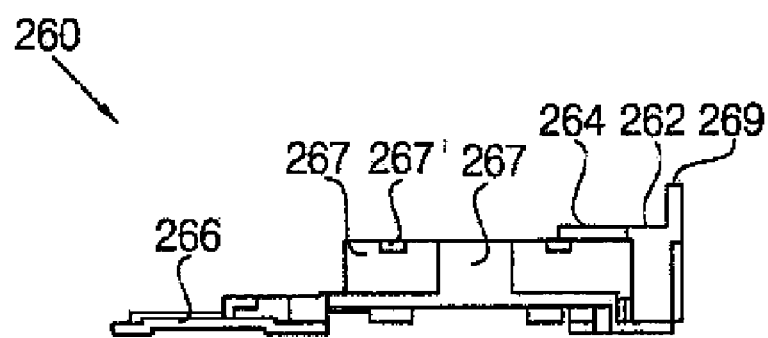
FIG. 11f is a right-side view showing the configuration of the hinge frame according to third embodiment of the present invention.

Next, a third embodiment of the present invention will be described with reference to FIGS. 9 to 11. In this embodiment, a bottom case 231 and a keyboard deck 233 define an external appearance of a main body 230 of the portable computer. In general, the bottom case 231 defines a bottom external appearance of the main body 230 while the keyboard deck 233 defines a top external appearance of the main body 230. A keyboard 234 is provided on the keyboard deck 233.

A display unit 237 is connected to a rear end of the main body 230 via a hinge unit 235. The display unit 237 can be rotated about the hinge unit 235 with respect to the main body 230. The display unit 237 is generally provided with a liquid crystal panel 238. A side wall 240 is provided at a rear end of a side of the bottom case 231. The side wall 240 defines a portion of a side surface of the main body 230. A rear wall 242 is provided at a rear end of the bottom case 231 such that it is connected to the rear end of the side wall 240. The rear wall 242 defines a rear surface of the main body 230. A plurality of openings 243 are formed on the side wall 240 and rear wall 242. The openings 243 are used to expose connectors 252 and 253 and a power jack 254, which will be explained later, to the outside. Fastening holes 244 for fastening the hinge unit 235 are perforated into the rear wall 242.

A plurality of first fastening bosses 246 and second fastening bosses 247 are formed in a region adjacent to a rear corner of the bottom case 231, i.e. a corner where the side wall 240 and the rear wall 242 are interconnected with each other (hereinafter, referred to as a "corner region 245"). A threaded portion is formed at inner circumferential surface of each of the first fastening bosses 246, while a through hole is vertically formed at each of the second fastening bosses 247. A fastener extends from a bottom face to a top face of the bottom case 231 through each second fastening boss 247 such that the bottom case 231 is fastened to the keyboard deck 233.

A plurality of guide bosses 248 are also provided at the corner region 245 of the bottom case 231. Each of the guide bosses 248 is formed with a predetermined upward groove. A portion of the fastener that causes a board 250 and hinge frame 260 to be fastened to each other is securely seated into the groove.

Furthermore, the main board 250 is installed within the main body 230. A variety of parts including a central processing unit (CPU) are mounted on the main board 250. The connectors 252 and 253 and power jack 254 are mounted on the corner of the main board 250 corresponding to the corner region 245. A cut-away portion 251 that is removed from the main board 250 to prevent interference with other parts.

A connector 252 is provided at a rear edge of the main board 250 adjacent to the rear wall 242. Different connectors may be used as the connector 252 depending on design requirements. For example, either a separate LAN connector or modem connector or a connector in which the two connectors are integrated may be installed. Reference numeral 253 denotes a USB connector that is exposed to the side wall 240 and provided on the main board 250.

A power jack 254 is mounted at the rear edge of the main board 250 adjacent to the connector 252 such that it is exposed to the opening 243 of the rear wall 242. The power jack 254 serves to connect an external power source and the main board 250. In addition, a plurality of fastening holes 257 are formed on the region of the main board where the connectors 252 and 253 and the power jack 254 are mounted. The fastening holes 257 are perforated at positions corresponding to the first and second fastening bosses 246 and 247 and the guide bosses 248. Each of the first fastening bosses 246 is a part where the fastener, which passes through the main board 250 and the hinge frame 260, is fastened. Each of the second fastening bosses 247 is a part that allows the fastener to pass through the main board 250 and the hinge frame 260 from the bottom of the bottom case 231 such that the fastener can be fastened to a bottom surface of the keyboard deck 233.

The hinge frame 260 is used to fix the hinge unit 235 to the main body 230. The hinge frame 260 also performs the functions of covering the connectors and power jack 252, 253 and 254 and reinforcing the main board 250 in addition to fixing the hinge unit 235. The hinge frame 260 is fastened and fixed to the main board 250 and the bottom case 231.

FIGS. 11A to 11D show in detail the configuration of the hinge frame 260. It is preferred that a frame body 261 of the hinge frame 260 be made of a metal material. This is because the hinge frame can have certain strength and perform a function of shielding electromagnetic waves. However, if the function of shielding electromagnetic waves is not required, the frame body 261 may be molded from a synthetic resin.

The frame body 261 is formed with a perforated portion 261' at a certain position thereof. The perforated portion 261' is formed by vertically perforating the frame body 261 and used to reduce the weight of hinge frame 260 as well as to allow the parts installed on the main board 250 to be exposed to the outside when the frame body 261 is mounted on the main board 250. The size, the position, etc. of the perforated portion 261' should vary with the positions of parts mounted on the main board 250.

A first covering portion 262 is provided at a certain position on the frame body 261. The first covering portion 262 is formed along the top surface and side surfaces of the connector 252 with a constant width. The first covering portion 262 is open at a rear edge of the frame body 261, i.e. toward the rear wall 242, and also communicates with the perforated portion 261'. Further, the first covering portion 262 is open toward the top surface of the main board 250. The first covering portion 262 is formed in such a manner that it protrudes at a top face of the frame body 261 and is recessed at a bottom face of the frame body 261.

The first covering portion 262 serves to hold or support the connector 252 on the main board 250 not to inadvertently move thereon. That is, when the frame body 261 is fastened to the main board 250, the connector 252 is firmly positioned in a space defined by the main board 250 and the first covering portion 262 of the frame body 261.

A hinge fastening portion 263 is provided at a position adjacent to the first covering portion 262. The hinge unit 235 is fastened to the hinge fastening portion 263. A plurality of fastening holes 263' are perforated through the hinge fastening portion 263 such that the hinge unit 235 is fastened with the fastener.

A second covering portion 264 is formed at a position adjacent to the hinge fastening portion 263. The second covering portion 264 serves to cover the power jack 254. The second covering portion 264 is formed in such a manner that it protrudes at the top face of the frame body 261 and is recessed at the bottom face of the frame body 261 (i.e., a surface facing the main board 250). A through hole 264' is formed on a top surface of the second covering portion 264. The hole 264' serves to reduce the weight of the hinge frame 260. The second covering portion 264 is also open toward the rear wall 242, and thus, the power jack 254 can be exposed to the outside through the opening 243.

A locking hole reinforcing portion 265 is formed to extend from the second covering portion 264. The locking hole reinforcing portion 265 serves to reinforce a locking hole 240' perforated through the side wall 240. The locking hole 240' is a part in which a protrusion of a locking mechanism for locking the portable computer to the furniture or desk is hooked. The locking hole reinforcing portion 265 is seated in a rear surface of the rear wall 240 with the locking hole 240' perforated therethrough so as to reinforce the locking hole 240'. The locking hole reinforcing portion 265 is formed with a locking hole 265' at a position corresponding to the locking hole 240'.

A board reinforcing portion 266 is further provided at a position on the frame body 261 opposite to the locking hole reinforcing portion 265. The board reinforcing portion 266 is fastened to the main board 250 and serves to reinforce the fastened portion of the main board 250. In this embodiment, the board reinforcing portion 266 is fastened to a portion of which a width of the main board is relatively reduced in the main board 250 by way of a cut-away portion 251, and thus, reinforces the strength in the narrow portion.

In addition, a cable passage 267 is formed in the frame body 261. The cable passage 267 is formed along a portion on a top surface of the frame body 261. The cable passage 267 is formed by causing the top surface of the frame body 261 to be recessed. Protrusions 267' are formed at regular intervals along opposite lateral sides of the cable passage 267. The protrusions 267' are preferably formed alternately at the opposite sides of the cable passage 267. The cable passage 267 prevents cables from inadvertently escaping out of the cable passage 267. The cables for electrical connection between the main body 230 and the display unit 235 pass through the cable passage 267.

A plurality of fastening holes 268 are perforated through the frame body 261. The fastening holes 268 are used to fasten the hinge frame 260 to the main board 250 or bottom case 231. The fastening holes 268 are formed at regions out of the covering portions 262 and 264, the perforated portion 261' and the like, by vertically perforating the frame body 261. In particular, since the frame body 261 requires a space for defining the covering portions 262 and 264, the fastening holes 268 are perforated at the positions where the top surface of the frame body 61 is relatively depressed. The fastening holes 268 are formed at the positions corresponding to the fastening holes 257 on the main board 250.

A hinge cap catching portion 269 is provided on a top surface of the first covering portion 262 of the frame body 261. The hinge cap catching portion 269 is a part in which an end of a hinge cap (not shown) for preventing the hinge unit 235 from being exposed to the outside of the main body 230 is hooked.

Hereinafter, the operation of the hinge frame and the structure and method for mounting the same according to the respective preferred embodiments of the present invention configured as above will be described in detail with reference to the accompanying drawings.

First, it is described how to fasten the hinge frame 60 to the main board 50 and bottom case 31 in accordance with the first embodiment of the present invention. The hinge frame 60 is first mounted to the main board 50. The hinge frame 60 is securely seated on the main board 50 in such a manner that the first covering portion 62 covers the modem connector 52 and LAN connector 53, the second covering portion 64 covers the USB connector 54, the third covering portion 65 covers the power jack 55, and the fourth covering portion 66 covers the external monitor connector 56.

Then, the external monitor connector 56 is fastened to the hinge frame 60 via connector fastening holes 66'. The main board 50 with the hinge frame 60 seated thereon is also seated onto the bottom case 31. At this time, a bottom surface in the corner region of the main board 50 is supported by the fastening bosses 46 and the guide bosses 47.

Next, the relevant fasteners are fastened into the fastening holes 68 of the hinge frame 60 and the fastening holes 57 of the main board corresponding to the guide bosses 47. A tip end of the fastener is seated in the groove of the boss 47.

Furthermore, the other fasteners are fastened to the main board 50 and the hinge frame 60 through the fastening bosses 46 from the bottom of the bottom case 31. Therefore, the bottom case 31, the main board 50 and the hinge frame 60 are sequentially fastened with one another by the fasteners passing through the fastening bosses 46. Accordingly, since the main board 50 is fastened with either the hinge frame 60 or the bottom case 31 and hinge frame 60, its strength can be enhanced.

Then, a portion of the hinge unit 35 is fastened to the hinge fastening portion 63 of the hinge frame 60. The hinge unit 35 is fastened simultaneously to the hinge frame 60 and the bottom case 31 by means of the fasteners that pass through the fastening holes 44 formed on the rear wall 42 of the bottom case 31. The portion of the hinge unit 35 is also fastened on a top surface of the hinge frame 60.

As described above, since the hinge frame 60 is fastened to the main board 50 and bottom case 31, the connectors 52, 53, 54 and 56 and the power jack 55 are covered with the hinge frame 60. Further, since the connectors and power jack are positioned between the main board 50 and hinge frame 60 which are substantially integrally formed with each other, their mounting strength is relatively increased. Since it is made of a metal material, the hinge frame also serves to prevent electromagnetic waves from being radiated to the outside through the connectors 52, 53, 54 and 56 and the power jack 55.

Next, the operation of the second embodiment will be described. The board 50 is seated on the fastening bosses 146 and the guide bosses 147 in the corner region 145. Then, the hinge frame 160 is seated on the board 150. At this time, the audio jack 153 is covered with the first covering portion 162 of the hinge frame 160, the super video jack 153 is covered with the second covering portion 164 of the hinge frame 160, and the USB connector 154 is covered with the third covering portion 166 of the hinge frame 160.

After the hinge frame 160 is seated on the board 150 as described above, the fasteners are fitted into the fastening holes 168 corresponding to the guide bosses 147 such that the hinge frame 160 and the board 150 are fastened with each other. Then, the hinge unit 135 is mounted and fastened onto the hinge frame 160. The hinge unit 135 is fastened onto the hinge fastening portion 163 of the hinge frame 160. That is, the fasteners are fastened to the hinge fastening portion 163 from the top of the hinge frame 160 through the hinge unit 135. In addition, other fasteners are installed through the hinge fastening holes 144 formed on the rear wall 142 such that the bottom case 131, the hinge frame 160 and the board 150 are integrally fastened with one another.

The hinge frame 260 can also be fastened to the main board 250 and the bottom case 231 in accordance with the third embodiment of the present invention. The hinge frame 260 is first mounted on the main board 250. In other words, the hinge frame 260 is seated onto the main board 250 in such a manner that the connector 252 is covered with the first covering portion 262 of the hinge frame 260 and the power jack 254 is covered with the second covering portion 264 of the hinge frame 260.

Then, the fasteners are fastened into the fastening holes 257 and 268 of the main board 250 and hinge frame 260 corresponding to the guide bosses 248. That is, the fasteners are fastened into the fastening holes 257 and 258 of the main board 250 and hinge frame 260 from the bottom of the main board 250. Thereafter, the main board 250 with the hinge frame 260 seated thereon is seated onto the bottom case 231. At this time, a bottom surface of the main board 250 corresponding to the corner region 245 is supported by the fastening bosses 246 and 247 and the guide bosses 248.

Other fasteners are fastened through the fastening holes 268 and 257 of the hinge frame 260 and the main board 250 corresponding to the first fastening bosses 246 in a state where the main board 250 is seated on the bottom case 231. At this time, the fasteners are fastened into the first fastening bosses 246 through the main board 250 from the hinge frame 260.

In a state where the keyboard deck 233 is prefabricated to the bottom case 231, the bottom case 231, main board 250, hinge frame 260 and keyboard deck 233 are fastened with one another through the second fastening bosses 247. In other words, the bottom case 231, main board 250, hinge frame 260 and keyboard deck 233 are fastened with one another at one time by fastening the fasteners into the second fastening bosses from the bottom of the bottom case 231.

Accordingly, the locking hole reinforcing portion 265 is placed at the rear surface of the side wall 240 with the locking hole 240' provided thereon. At this time, the locking holes 240' and 265' of the side wall 240 and locking hole reinforcing portion 265 are aligned with and communicate with each other.

In addition, the cables are placed in the cable passage 267. The cables connect between the main body 230 and the display unit 237. The protrusions 267' prevent cables from being escaped inadvertently from the cable passage 267. Further, a portion of the hinge unit 235 is fastened to the hinge fastening portion 263 of the hinge frame 260. The hinge frame 260 are fastened simultaneously to the hinge frame 260 and bottom case 231 by the fasteners that pass through the hinge fastening holes 244 formed on the rear wall 242 of the bottom case 231. The portion of the hinge unit 235 is also fastened on a top surface of the hinge frame 260. Then, a hinge cap is hooked onto a hinge cap catching portion 269 such that the hinge unit 235 is not exposed to the outside.

As described above, since the hinge frame 260 is fastened to the main board 250, bottom case 231 and keyboard deck 233, the connectors 252 and 253 and the power jack 254 are covered with the hinge frame 260. Further, since the connectors and power jack are positioned between the main board 250 and hinge frame 260 which are substantially integrally formed with each other, their mounting strength is relatively increased.

Further, since the board reinforcing portion 266 of the hinge frame 260 is fastened to both the first and second fastening bosses 246 and 247, it is substantially fastened to the bottom case 231, keyboard deck 233, and main board 250. Therefore, the strength of the fastened potions of the main board 250 is relatively increased.

Since the hinge frame 260 is also made of a metal material, it also serves to prevent electromagnetic waves from being radiated to the outside through the connectors 252 and 253 and the power jack 254. The hinge frame for a portable computer and structure for mounting the same according to the present invention configured as described above in detail has the following advantages.

Since the hinge frame is coupled with the board and bottom case over a relatively large region, the magnitude of load that is held or supported by the hinge unit fixed to the hinge frame becomes relatively large. Therefore, there is an advantage in that the hinge unit to which large load is applied due to the display unit of the large portable computer can be more firmly fixed to the main body.

Further, since a plurality of covering portions are provided in the hinge frame, the connectors and jack mounted on the board can be more firmly fixed by simply fastening the hinge frame onto the board. Therefore, there is another advantage in that the strength of the connectors and jack to be mounted on the board is relatively enhanced, and thus, endurance and reliability of the products are improved.

Furthermore, since the connectors and jack mounted on the board are covered with the hinge frame made of a metal material, electromagnetic waves can be prevented from being leaked out through the connectors and jack.

Moreover, since the hinge frame is fastened simultaneously to the board and bottom case, there is a further advantage in that board strength can be reinforced. Finally, since the hinge frame has a variety of functions as described above, a single hinge frame can be substituted for several parts or components. Therefore, there is a still further advantage in that the number of parts of the portable computer can be minimized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hinge frame for a portable computer, comprising:
a frame body having an upper surface and a lower surface, the frame body being formed with at least one perforated fastening hole;
a hinge fastening portion being formed at a portion of the frame body and being capable of receiving a hinge unit fastened on the upper surface thereto; and
at least one covering portion being formed along an edge of the frame body for covering parts mounted on a board positioned beneath the lower surface of the frame body, wherein the at least one covering portion includes a raised surface protruding to a first side of the frame body and a recess facing toward an opposite side of the frame body,
wherein a plurality of fastening bosses are formed on a bottom case with fastening holes vertically perforating the fastening bosses, and fasteners are fastened to the hinge frame from a bottom of the bottom case,
wherein a plurality of guide bosses are formed on the corner region adjacent to the fastening bosses on the bottom case,
wherein each of the guide bosses is formed with a groove into which a fastener for securing the hinge frame and the board together is seated, and
wherein the hinge frame is configured to be seated on a corner region of a board adjacent to a corner of the bottom case where a side wall and a rear wall of the bottom case interconnect with each other, the board being fastened to the bottom case.

2. The hinge frame according to claim 1, wherein the frame body is made of a metal material or a synthetic resin.

3. The hinge frame according to claim 1, wherein the at least one fastening hole is formed in a portion of the upper surface of the frame body not including the at least one covering portion.

4. The hinge frame according to claim 1, further comprising a cable passage for guiding a cable provided along a side of the frame body.

5. The hinge frame according to claim 4, wherein the cable passage is formed as a recessed portion along the upper surface of the frame body.

6. The hinge frame according to claim 1, wherein the raised surface of the at least one covering portion protrudes upwardly away from the upper surface.

7. The hinge frame according to claim 1, further comprising a locking hole reinforcing portion having a locking hole formed therein, the locking hole reinforcing portion being provided at a portion of the frame body.

8. A portable computer main body comprising:
a bottom case including a plurality of fastening bosses protruding from a bottom surface thereof;
a board fastened to the fastening bosses of the bottom case;
a hinge frame, the hinge frame having
a frame body having an upper surface and a lower surface, the frame body being formed with at least one perforated fastening hole;
a hinge fastening portion being formed at a portion of the frame body and being capable of receiving a hinge unit fastened on the upper surface thereto; and
at least one covering portion being formed along an edge of the frame body for covering parts mounted on the board positioned beneath the lower surface of the frame body, wherein the at least one covering portion includes a raised surface protruding to a first side of the frame body and a recess facing toward an opposite side of the frame body; and
a hinge unit secured to the hinge frame and permitting a display unit to rotate about the hinge unit with respect to the main body;
a plurality of guide bosses formed on the corner region adjacent to the fastening bosses on the bottom case,
wherein each of the guide bosses is formed with a groove into which a fastener for securing the hinge frame and the board together is seated,
wherein a plurality of fastening bosses are formed with fastening holes vertically perforating the fastening bosses, and fasteners are fastened to the hinge frame from a bottom of the bottom case; and
wherein the hinge frame is seated on a corner region of the board adjacent to a corner of the bottom case where a side wall and a rear wall of the bottom case interconnect with each other.

9. The main body according to claim 8, wherein the at least one covering portion opens toward an opening formed in either the side wall or the rear wall to permit a part of the board covered with the at least one covering portion to be exposed to the exterior of the main body.

10. The main body according to claim 9, further comprising a locking hole reinforcing portion, the locking hole reinforcing portion having a locking hole at a portion of the hinge frame.

11. The main body according to claim 9, further comprising a perforated portion in the upper surface of the frame body for reducing a weight of the hinge frame.

12. The main body according to claim 9, further comprising a reinforcing portion formed in the frame body for securing the hinge frame to the board.

13. The main body according to claim 8, wherein the hinge frame is made of a metal material or a synthetic resin.

14. The main body according to claim 8, further comprising a cable passage for guiding a cable along a side of the hinge frame.

15. A portable computer comprising:
a bottom case including a plurality of fastening bosses protruding from a bottom surface thereof;
a display unit secured to the bottom case;
a board fastened to the fastening bosses of the bottom case;
a hinge frame, the hinge frame having
a frame body having an upper surface and a lower surface, the frame body being formed with at least one perforated fastening hole;
a hinge fastening portion being formed at a portion of the frame body and being capable of receiving a hinge unit fastened on the upper surface thereto; and
at least one covering portion being formed along an edge of the frame body for covering parts mounted on the board positioned beneath the lower surface of the frame body, wherein the at least one covering portion includes a raised surface protruding to a first side of the frame body and a recess facing toward an opposite side of the frame body; and
a hinge unit secured to the hinge frame and permitting the display unit to rotate about the hinge unit with respect to the main body; and
a plurality of guide bosses formed on the corner region adjacent to the fastening bosses on the bottom case,
wherein each of the guide bosses is formed with a groove into which a fastener for securing the hinge frame and the board together is seated, a plurality of the fastening bosses are formed with fastening holes vertically perforating the fastening bosses, and fasteners are fastened to the hinge frame from a bottom of the bottom case; and wherein the hinge frame is seated on a corner region of the board adjacent to a corner of the bottom ease where a side wall and a rear wall of the bottom case interconnect with each other.

16. A method for assembling a hinge frame for a computer, the method comprising:

securing the hinge frame to a bottom case of the computer, wherein a board is positioned between an upper surface of the bottom case and a lower surface of the hinge frame, the at least one covering portion covering a part mounted on the board, wherein the hinge frame includes:

a frame body having an upper surface and a lower surface, the frame body being formed with at least one perforated fastening hole;

a hinge fastening portion being formed at a portion of the frame body and being capable of receiving a hinge unit fastened on the upper surface thereto; and at least one covering portion being formed along an edge of the frame body for covering a pan mounted on a board positioned beneath the lower surface of the frame body, wherein a plurality of fastening bosses are formed on a bottom case with fastening holes vertically perforating the fastening bosses, and fasteners are fastened to the hinge frame from a bottom of the bottom case, wherein a plurality of guide bosses are formed on the corner region adjacent to the fastening bosses on the bottom case, wherein each of the guide bosses is formed with a groove into which a fastener for securing the hinge frame and the board together is seated, and wherein the at least one covering portion includes a raised surface protruding to a first side of the frame body and a recess facing toward an opposite side of the frame body, and wherein the hinge frame is seated on a corner region of the board adjacent to a corner of the bottom case where a side wall and a rear wall of the bottom case interconnect with each other.

17. The method according to claim 16, further comprising securing the hinge frame to a wall of the bottom case with a locking hole formed in a looking hole reinforcing portion of the hinge frame.

18. A hinge frame for a portable computer, comprising:

a frame body formed with a plurality of perforated fastening holes and a perforated portion for permitting a board positioned beneath the frame body to be exposed through the frame body;

a hinge unit;

a hinge fastening portion formed at a portion of the frame body to permit the hinge unit to be fastened thereto;

a plurality of covering portions formed along an edge of the frame body to cause parts mounted on a board to be seated beneath the covering portions; and a reinforcing portion formed at a portion of the frame body along a periphery of the perforated portion and being fastened to the board to reinforce the board, wherein a plurality of fastening bosses are formed on a bottom case with fastening holes vertically perforating the fastening bosses, and fasteners are fastened to the hinge frame from a bottom of the bottom case, wherein a plurality of guide bosses are formed on the corner region adjacent to the fastening bosses on the bottom case, wherein each of the guide bosses is formed with a groove into which a fastener for securing the hinge frame and the board together is seated, and wherein the hinge frame is configured to be seated on a corner region of the board adjacent to a corner of the bottom case where a side wall and a rear wall of the bottom case interconnect with each other, the board being fastened to the bottom case.

19. The hinge frame according to claim 18, wherein the frame body is made of a metal material or a synthetic resin, and the fastening holes are formed at positions in the frame body not including the covering portions and the perforated portion.

20. The hinge frame according to claim 18, wherein the fastening holes are formed at positions in the frame body not including the covering portions and the perforated portion, the covering portions and the fastening holes being positioned along the periphery of the perforated portion.

21. The hinge frame according to claim 18, wherein a cable passage for guiding a cable is further provided along a side of the frame body, and protrusions for holding the cable in the cable passage are formed alternately along opposite lateral sides of the cable passage.

22. The hinge frame according to claim 18 further comprising a locking hole reinforcing portion with a locking hole formed therein, the locking hole reinforcing portion being formed at a portion of the frame body.

23. The hinge frame according to claim 18, wherein a first covering portion of the hinge frame includes a hinge cap catching portion for securing a hinge cap.

* * * * *